R. DUNWODY.
TURPENTINE RECEPTACLE.
APPLICATION FILED SEPT. 8, 1911.
1,045,005.
Patented Nov. 19, 1912.
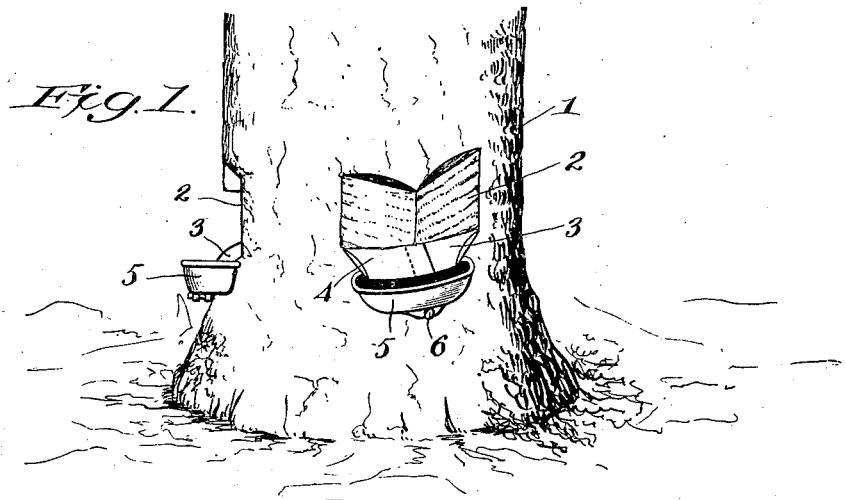
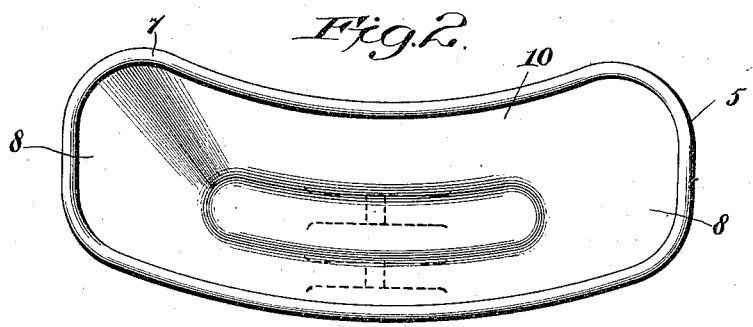
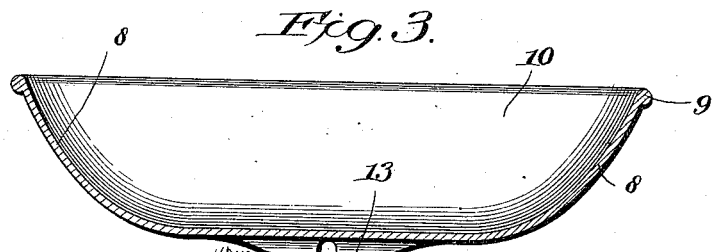
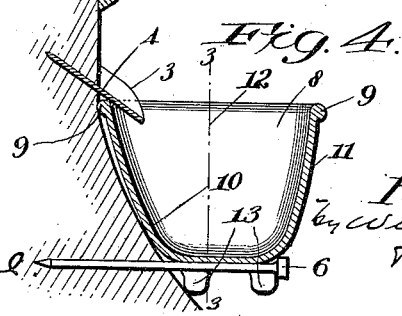
Witnesses
Byron B. Collings.
Geo. H. Byrne.
Inventor
R. Dunwody,
by Wickersham Fisher
T Witherspoon
Attorneys
COLUMBIA PLANOGRAPH CO., WASHINGTON, D. C.

UNITED STATES PATENT OFFICE.

ROBSON DUNWODY, OF JACKSONVILLE, FLORIDA, ASSIGNOR TO NEAL NAVAL STORES COMPANY, A CORPORATION OF GEORGIA.

TURPENTINE-RECEPTACLE.

1,045,005.   Specification of Letters Patent.   Patented Nov. 19, 1912.

Application filed September 8, 1911.   Serial No. 648,389.

*To all whom it may concern:*

Be it known that I, ROBSON DUNWODY, a citizen of the United States, residing at Jacksonville, in the county of Duval and State of Florida, have invented certain new and useful Improvements in Turpentine-Receptacles; and I do hereby declare the following to be a full, clear, and exact description of the invention, such as will enable others skilled in the art to which it appertains to make and use the same.

This invention relates to turpentine cups, and has for its object to produce a receptacle which will be easy of attachment to and detachment from the tree, one which will maintain the center of gravity of the contents immediately over its support, one that is not liable to be accidentally knocked off, one having such a shape that the turpentine may be easily dipped therefrom, and one which will be made of a material that is not attacked by the constituents of the turpentine.

To these ends the invention consists in the novel details of construction and combinations of parts more fully hereinafter disclosed and particularly pointed out in the claims.

Referring to the accompanying drawings forming a part of this specification in which like numerals designate like parts in all the views:—Figure 1 is a diagrammatic view illustrating the use of my invention; Fig. 2 is a plan view of a cup or receptacle made in accordance with my invention; Fig. 3 is a longitudinal section on the line 3—3 of the parts shown in Fig. 4; and, Fig. 4 is a cross sectional view of the parts shown in Fig. 1.

1 indicates the tree from which the turpentine is gathered, 2 indicates the scarified portion of said tree, 3 and 4 indicate the two halves of the apron which directs the turpentine from the scarified portion 2 into the cup or receptacle 5, which is supported by the nail or other means 6 which enters the tree, all as will be clearly understood from the drawings.

The cup 5 is provided with a curved portion 7 adapted to fit trees of small size, and is also provided with gently tapered curves 8 at each end, in order that a paddle or other instrument may be readily inserted, and the turpentine scraped out or otherwise removed from the cup.

In practice, the apron 3, 4, is secured to the tree by any suitable means, and the upper rim 9 of the cup fits snugly under said apron, as illustrated, while the nail or other means 6 driven into the tree supports the weight of the cup and its contents. As these cups fill, however, it is important that the center of gravity of the contents should rest as nearly as possible squarely over the support 6, for otherwise there would be a tendency of the cup to dip one way or the other, and therefore much turpentine or gum is liable to be lost. In order to prevent this, the curved wall 10 which comes next to the tree is made more inclined than is the wall 11 which occupies the position farthest from the tree. The effect of this is that not only does the cup hug the tree much more closely than would otherwise be the case, but also the center of gravity of the contents is located in a position slightly to the right of the dotted line 3—3, Fig. 4, and below the point 12 on said line, and therefore weight is directly brought upon the supporting means 6, without any liability of the cup dipping.

In addition to the above, it often happens that through accident, such as animals coming in contact with the cup, or otherwise, the cup is displaced laterally, and therefore as the gum accumulates therein, it tends to be more and more displaced until finally its contents are spilled. In order to avoid this danger, I have provided the lugs 13 which extend on each side of the nail or support 6 and thereby effectually prevent any lateral displacement. These lugs are preferably molded integral with the cup, and thereby can be formed at a very trifling additional cost. The nail 6 can be driven if desired through a gage having just the right dimensions to leave a sufficient portion of the nail out of the tree to accommodate the cup, as indicated in Fig. 4.

With many of the cups now in use, it is found that the constituents of the gum attack the material of the cup, whether it be galvanized iron, copper, or other metallic material, and when the cups are made of clay in order to avoid this objection, it is found that they are so fragile they are easily broken and destroyed in the rough handling to which they are subjected by the cheap labor employed. In order to avoid this latter objection, I preferably incorporate into the structure of my cup crude cellulose fiber, which of course is inert to the constituents of the turpentine, and by molding this fibrous cup under heavy pressure, it is given sufficient resiliency and strength to withstand the rough usage which it encounters.

In use the upper beaded edge 9 of the cup is inserted under the apron 3, 4, and the lugs 13 are made to straddle the nail 6 when the cup is ready for receiving turpentine and is held securely in position throughout its period of filling. On the other hand, when it is desired to remove the cup from the tree for the purpose of obtaining the gum from the cup, it is only necessary to slightly tilt the cup in order to remove it from its position when it may be emptied and at once returned to its former place.

It is obvious that those skilled in the art may vary the features above mentioned without departing from the spirit of my invention, and therefore I do not wish to be limited to such features except as may be required by the claims.

What I claim is:—

1. A turpentine cup having an inwardly curved sloping wall on one side; and an outwardly curved opposite side wall having a less inclination to the vertical than said first-named wall for locating the center of gravity of said cup inside the center of the cross sectional diameter of the cup, whereby displacement of said cup when in use is avoided, substantially as described.

2. A turpentine cup having an inwardly curved and beaded sloping wall on one side; an outwardly curved and beaded side wall having a less inclination to the vertical than said first-named wall for locating the center of gravity inside the center of the cross sectional diameter of the cup, whereby displacement of said cup when in use is avoided; and provided with a slotted lug on its bottom adapted to receive a supporting means, substantially as described.

3. A turpentine cup having an inwardly curved and beaded sloping wall on one side; an outwardly curved and beaded opposite side wall having a less inclination to the vertical than said first-named wall for locating the center of gravity of said cup inside the center of the cross sectional diameter of the cup, whereby displacement of said cup when in use is avoided; having beaded inclined sloping end walls joining said side walls; and provided with a plurality of pairs of slotted lugs on its bottom adapted to receive a supporting means, substantially as described.

In testimony whereof, I affix my signature, in presence of two witnesses.

ROBSON DUNWODY.

Witnesses:
   Jos. G. Abramson,
   Meyer Forma.

---

Copies of this patent may be obtained for five cents each, by addressing the "Commissioner of Patents, Washington, D. C."